US007410282B2

(12) United States Patent
Eichelberger et al.

(10) Patent No.: US 7,410,282 B2
(45) Date of Patent: Aug. 12, 2008

(54) BI-FUNCTIONAL HEADLIGHT MODULE

(75) Inventors: Chris L. Eichelberger, Livonia, MI (US); John Li, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 72 days.

(21) Appl. No.: 11/257,688

(22) Filed: Oct. 25, 2005

(65) Prior Publication Data

US 2007/0091630 A1 Apr. 26, 2007

(51) Int. Cl.
*B60Q 1/02* (2006.01)
*F21V 11/00* (2006.01)
*F21V 7/00* (2006.01)
*F21V 21/00* (2006.01)

(52) U.S. Cl. ....................... 362/545; 362/507; 362/508; 362/514; 362/538; 362/543

(58) Field of Classification Search ................ 362/507, 362/464–468, 506, 508, 509, 512, 514, 523, 362/538, 539, 543, 544, 545, 232, 233, 235–243, 362/247, 248, 277–289, 319, 322, 323, 517, 362/298, 346
See application file for complete search history.

(56) References Cited

U.S. PATENT DOCUMENTS 3,894,227 A * 7/1975 Pitkjaan et al. ............. 362/543
4,914,747 A * 4/1990 Nino .......................... 362/539
5,673,990 A * 10/1997 Neumann et al. ........... 362/513
5,811,797 A 9/1998 Kobachi et al.
5,915,829 A * 6/1999 Kalze et al. ................. 362/465
6,179,455 B1 * 1/2001 Taniuchi ..................... 362/507
6,186,651 B1 * 2/2001 Sayers et al. ................ 362/512
6,190,029 B1 * 2/2001 Taniuchi et al. ............. 362/512
6,312,147 B2 * 11/2001 Eichler ....................... 362/539
6,443,606 B1 9/2002 Mochizuki
6,481,865 B2 * 11/2002 Woerner et al. ............... 362/41
6,674,096 B2 1/2004 Sommers
6,746,143 B1 6/2004 Van Duyn
6,891,333 B2 * 5/2005 Tatsukawa et al. ............ 315/82
6,897,459 B2 * 5/2005 Albou .................... 250/504 R
6,966,675 B2 * 11/2005 Albou ........................ 362/298
6,997,587 B2 * 2/2006 Albou ........................ 362/516
7,021,804 B2 * 4/2006 Van Duyn ................... 362/516
7,052,165 B2 * 5/2006 Field .......................... 362/524
2001/0006468 A1 * 7/2001 Hamm ....................... 362/525
2001/0010634 A1 * 8/2001 Yokoi ......................... 362/512
2001/0015896 A1 * 8/2001 Tsukamoto ................. 362/509
2001/0026457 A1 10/2001 Oyama et al.
2002/0001198 A1 * 1/2002 Eschler et al. .............. 362/510
2002/0051364 A1 5/2002 Ishikawa (Continued)

FOREIGN PATENT DOCUMENTS

EP 1193440 A1 * 4/2002

*Primary Examiner*—Hargobind S. Sawhney
*Assistant Examiner*—David R Crowe
(74) *Attorney, Agent, or Firm*—Fraser Clemens Martin & Miller LLC; J. Douglas Miller

(57) ABSTRACT

A bifunctional LED headlamp for a vehicle is disclosed, wherein at least one of a shield, a lens, a reflector, and an LED are movable to facilitate use of the headlamp in both a low beam mode and a high beam mode.

16 Claims, 11 Drawing Sheets

U.S. PATENT DOCUMENTS

| | | | | |
|---|---|---|---|---|
| 2002/0067620 | A1* | 6/2002 | Vanduyn et al. | 362/530 |
| 2002/0154513 | A1 | 10/2002 | Yagi et al. | |
| 2003/0090906 | A1* | 5/2003 | Hayakawa | 362/517 |
| 2003/0103358 | A1* | 6/2003 | Tatsukawa et al. | 362/539 |
| 2004/0046489 | A1 | 3/2004 | Vetorino et al. | |
| 2004/0125614 | A1 | 7/2004 | Ishida et al. | |
| 2004/0130907 | A1 | 7/2004 | Albou | |
| 2004/0145907 | A1* | 7/2004 | Suzuki | 362/513 |
| 2004/0202004 | A1 | 10/2004 | Van Duyn | |
| 2005/0018443 | A1 | 1/2005 | Tsukamoto | |
| 2005/0068787 | A1 | 3/2005 | Ishida | |
| 2005/0094413 | A1* | 5/2005 | Sazuka et al. | 362/544 |
| 2005/0094414 | A1 | 5/2005 | Ishida et al. | |
| 2005/0122735 | A1 | 6/2005 | Watanabe et al. | |
| 2005/0180156 | A1 | 8/2005 | Iwasaki | |
| 2005/0190572 | A1 | 9/2005 | Komatsu et al. | |
| 2005/0259431 | A1* | 11/2005 | Iwasaki | 362/514 |
| 2006/0039158 | A1* | 2/2006 | Kurz et al. | 362/539 |
| 2006/0209558 | A1* | 9/2006 | Chinniah et al. | 362/545 |
| 2007/0070638 | A1* | 3/2007 | Fukawa et al. | 362/475 |

* cited by examiner

FIG - 7
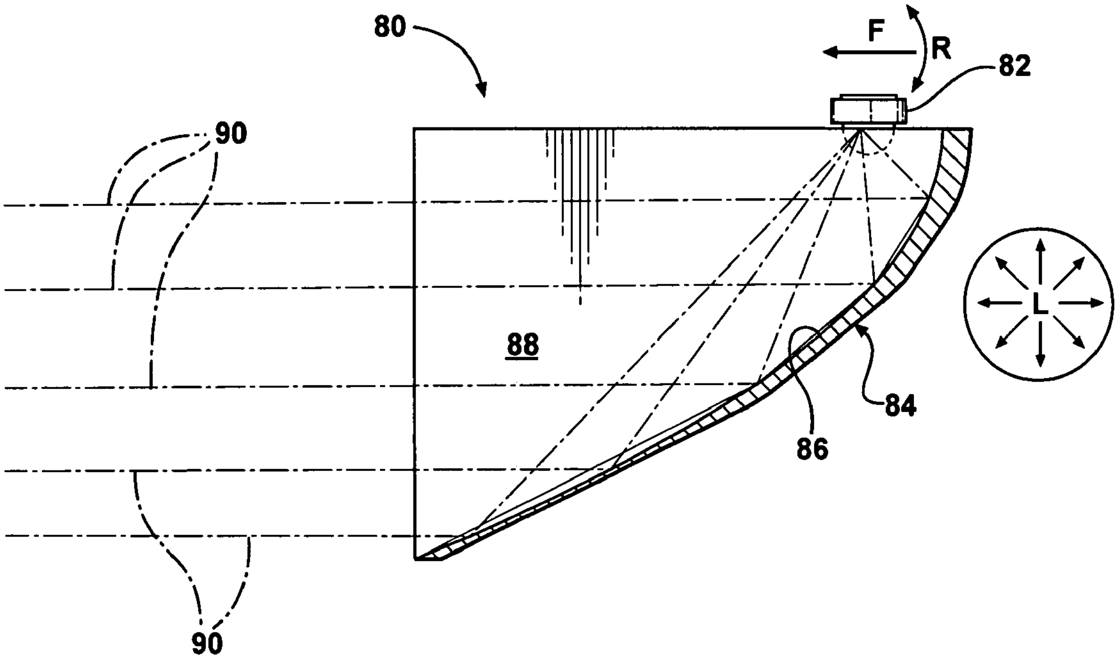
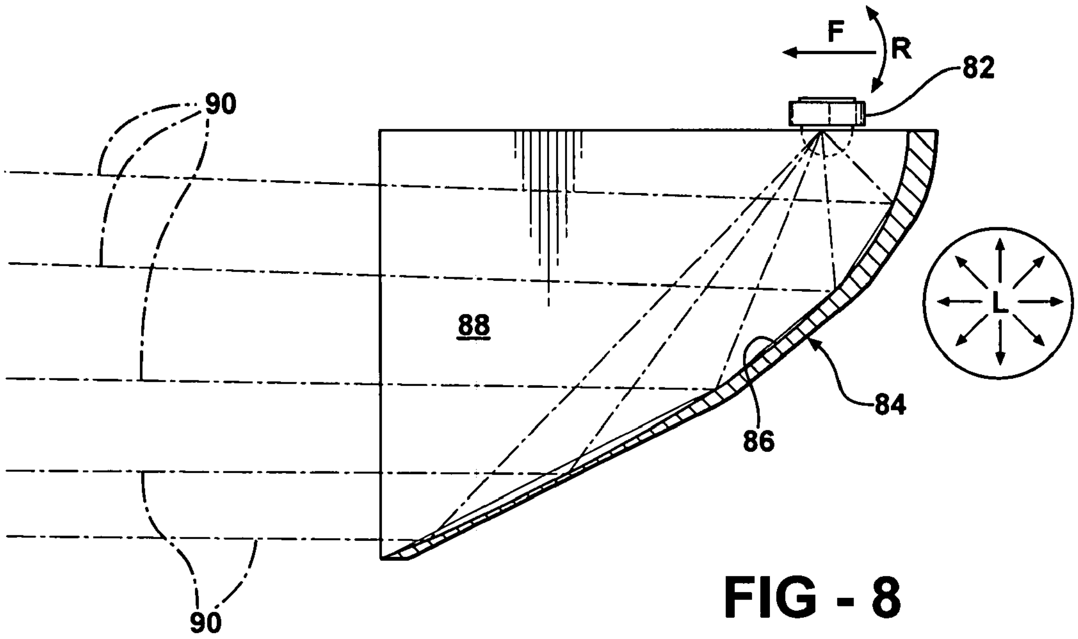
FIG - 8

BI-FUNCTIONAL HEADLIGHT MODULE

FIELD OF THE INVENTION

The invention relates to a lighting module and more particularly to a bifunctional LED headlamp for a vehicle, wherein the headlamp facilitates use in both a low beam mode and a high beam mode.

BACKGROUND OF THE INVENTION

Vehicle headlamps are required to include both a low beam mode and a high beam mode. Typically, the headlamp includes at least one light source and a reflector to direct light energy in a desired direction.

More recently, light emitting diodes or LED's have been used as a light source in vehicle headlamps. Typically, a plurality of LED lighting modules is required to result in a desired light intensity. Thus, the headlamp may include a plurality of individual lighting modules having one or more LED light sources disposed therein. Additionally, each individual lighting module typically has a dedicated function such as beam spread, hot spot, or cut-off, for example.

In prior art headlamps, to reach a desired intensity the number of LED lighting modules may approach 10 modules for the low beam mode, and 12 for the high beam mode. Each module also requires some form of thermal management. Thus, a large volume is required to package the lighting modules. As the desired requirements for headlamps continue to increase, the packaging volume requirements also increase. This results in additional space requirements in a vehicle, which is undesirable.

It would be desirable to produce a headlamp for a vehicle wherein the headlamp facilitates an economic and an efficient use in both a low beam mode and a high beam mode.

SUMMARY OF THE INVENTION

Consistent and consonant with the present invention, a headlamp for a vehicle wherein the headlamp facilitates an economic and an efficient use in both a low beam mode and a high beam mode, has surprisingly been discovered.

In one embodiment, the lighting module comprises a light-emitting element adapted to be connected to a source of electricity; a reflector disposed adjacent the light-emitting element and adapted to reflect light rays emitted from the light-emitting element in a desired direction; a shield spaced from the reflector in the desired direction and adapted to reflect the light rays directed on an upper surface thereof; and a lens spaced from the reflector and the shield in the desired direction and disposed in a path of the light rays, wherein at least one of the shield and the lens are movable to change the lighting module between operation in a low beam mode and a high beam mode.

In another embodiment, the lighting module comprises a light-emitting element adapted to be connected to a source of electricity; and a reflector disposed adjacent the light-emitting element and adapted to reflect light rays emitted from the light-emitting element in a desired direction, wherein at least one of the light-emitting element and the reflector is movable with respect to an other of the light-emitting element and the reflector to change the lighting module between operation in a low beam mode and a high beam mode.

In another embodiment, a headlamp for a vehicle comprises a headlamp body; and a plurality of lighting modules disposed in the headlamp body, wherein the modules including at least one of: a first lighting module comprising a light-emitting element adapted to be connected to a source of electricity; a reflector disposed adjacent the light-emitting element and adapted to reflect light rays emitted from the light-emitting element in a desired direction; a shield spaced from the reflector in the desired direction and adapted to reflect the light rays directed on an upper surface thereof; and a lens spaced from the reflector and the shield in the desired direction and disposed in a path of the light rays, wherein one of the shield and the lens are movable to change the lighting module between operation in a low beam mode and a high beam mode; and a second lighting module comprising a light-emitting element adapted to be connected to a source of electricity; and a reflector disposed adjacent the light-emitting element and adapted to reflect light rays emitted from the light-emitting element in a desired direction, wherein the light-emitting element is movable with respect to the reflector to change the lighting module between operation in a low beam mode and a high beam mode.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is a side cross-sectional view of a lighting module of a vehicle headlamp according to another embodiment of the invention and showing the lighting module in a low beam mode;

FIG. 8 is a side cross-sectional view of the lighting module of FIG. 7 showing the lighting module in a first high beam mode;

FIG. 14 FIG. 11 is a front view showing a vehicle headlamp according to another embodiment of the invention.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
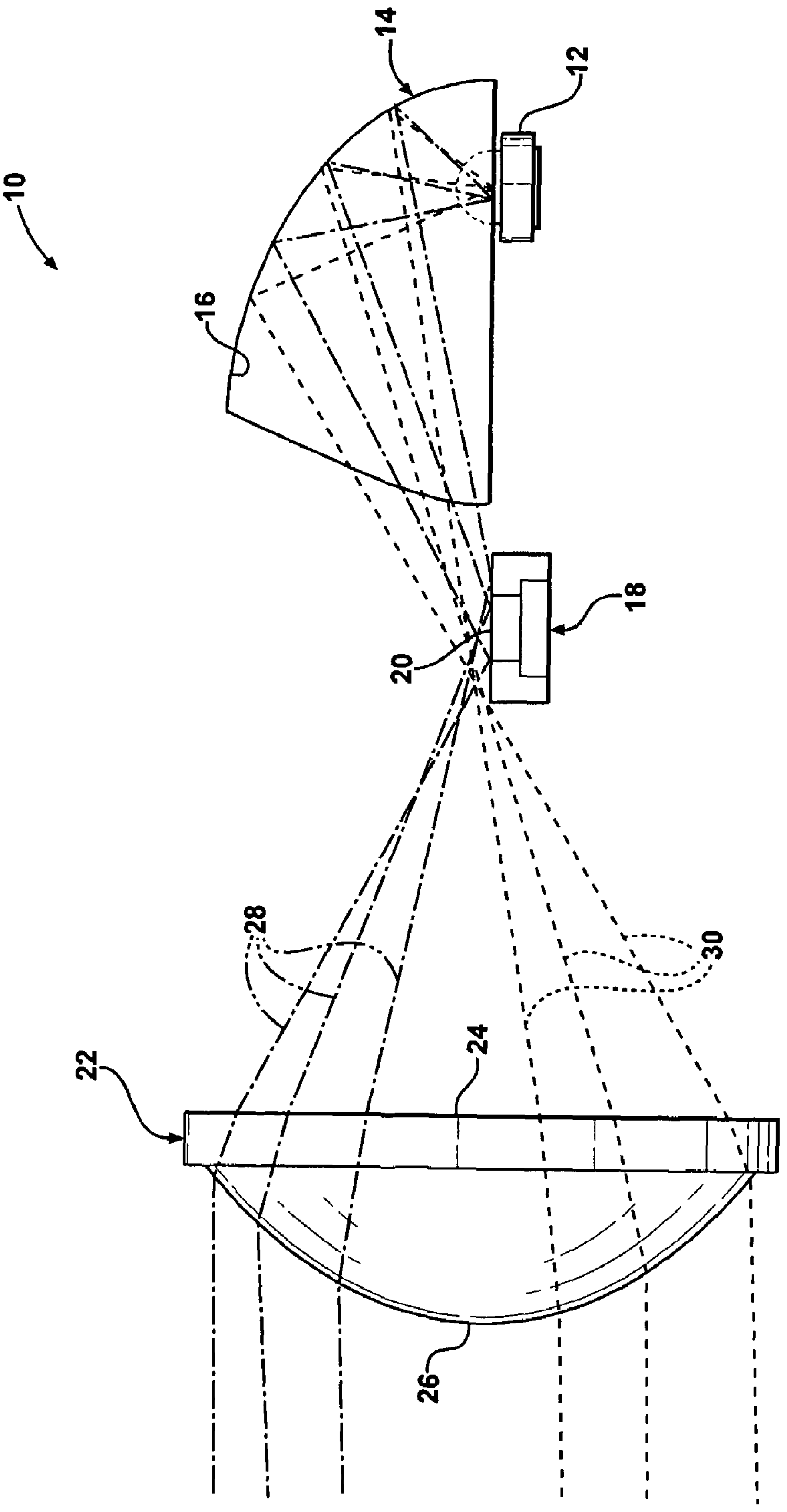
FIG. 1 is a side view of a lighting module of a vehicle headlamp according to an embodiment of the invention and showing the lighting module in a low beam mode.
Figure 2:
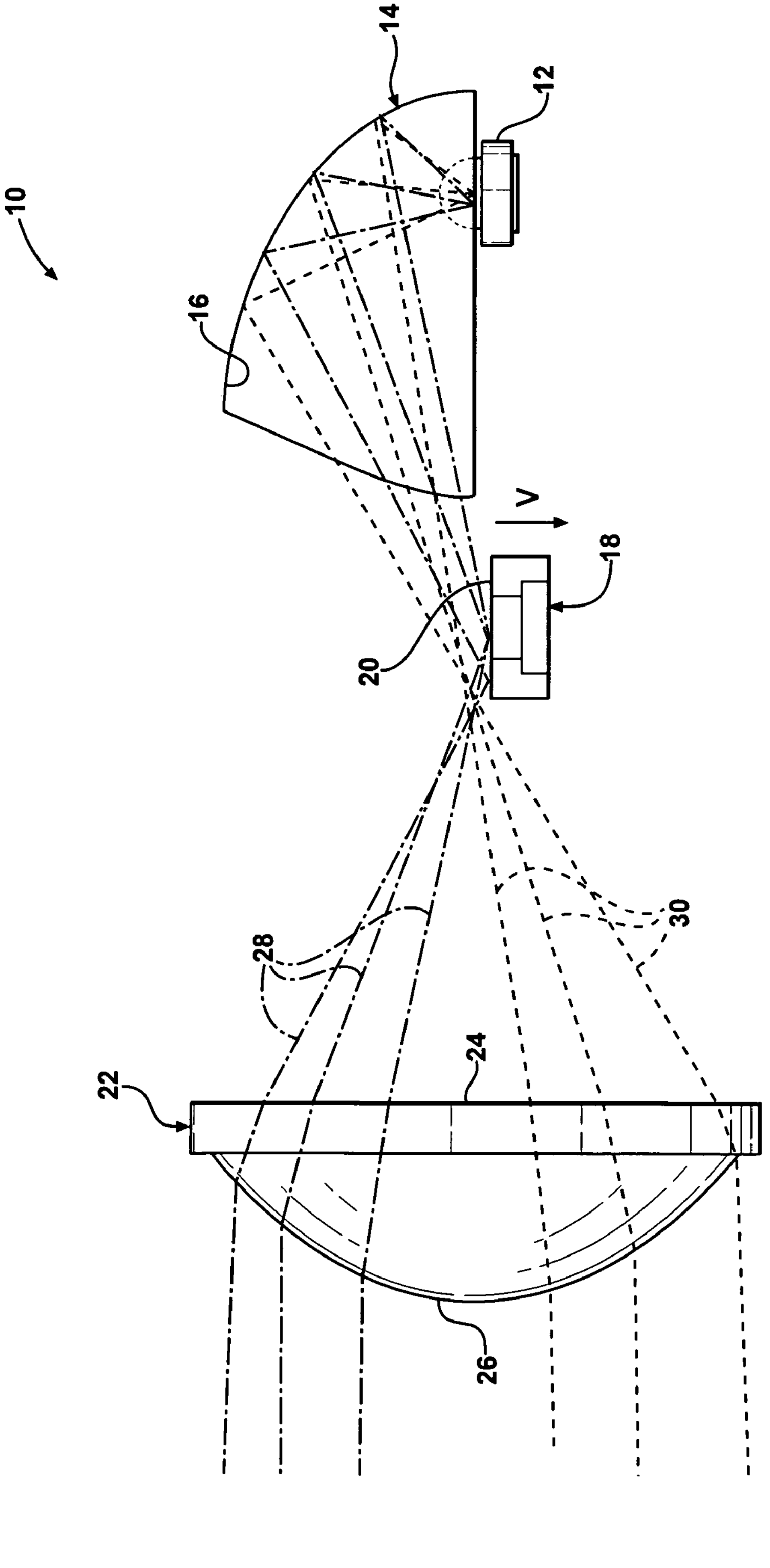
FIG. 2 is a side view of the lighting module of FIG. 1 and showing the lighting module in a first high beam mode.
Figure 3:
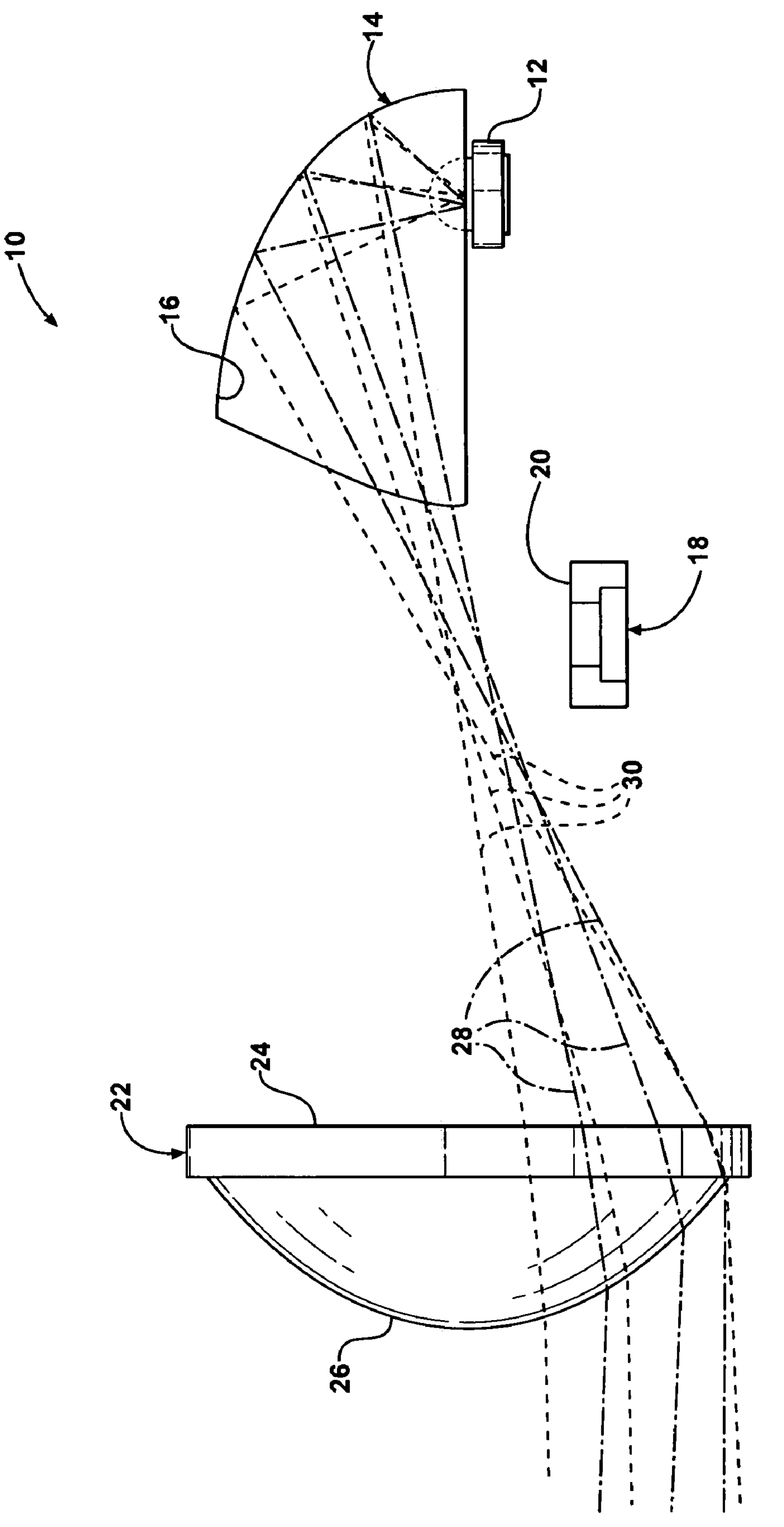
FIG. 3 is a side view of the lighting module of FIG. 1 and showing the lighting module in a second high beam mode.
Figure 4:
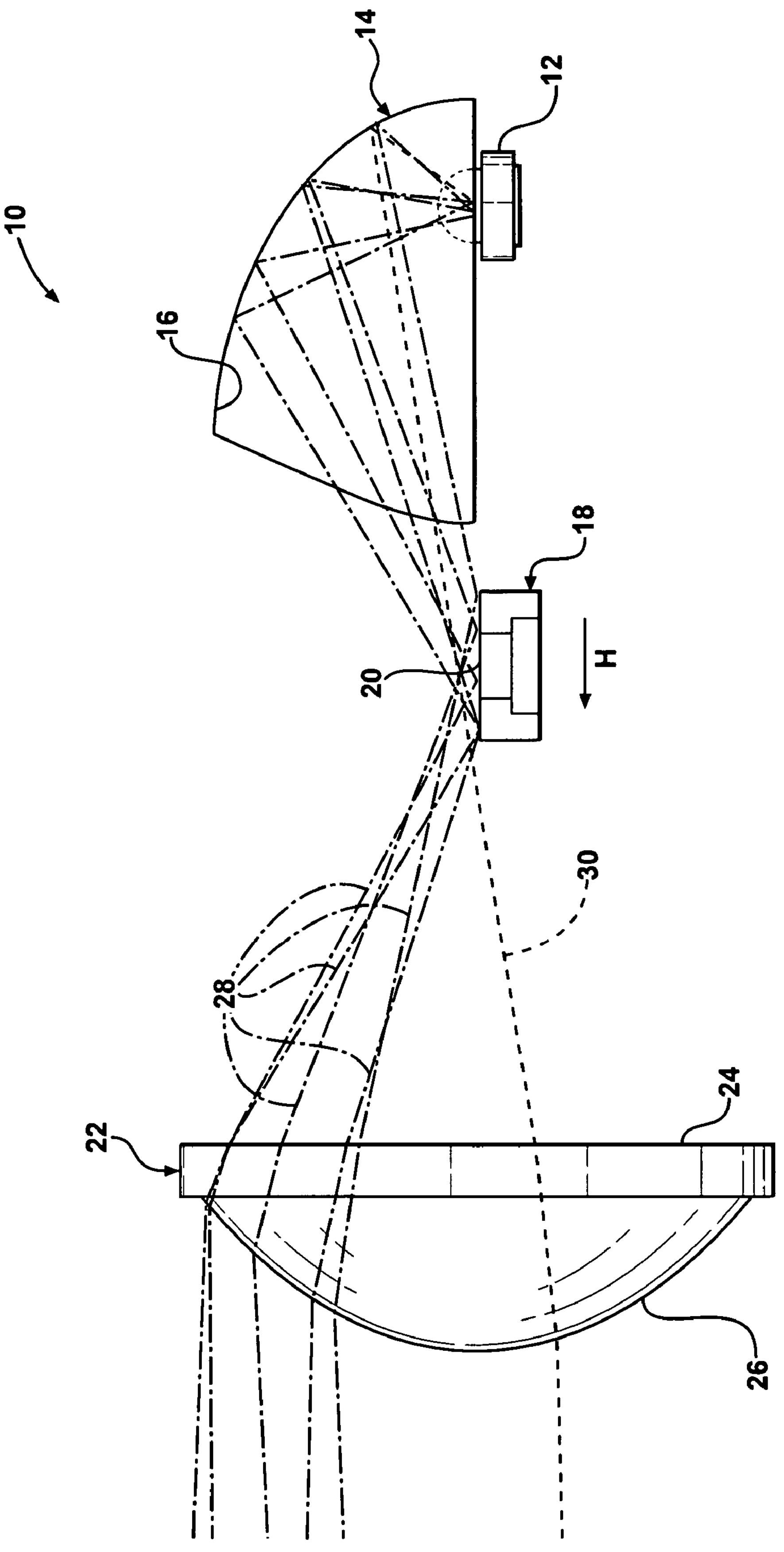
FIG. 4 is a side view of the lighting module of FIG. 1 and showing the lighting module in a third high beam mode.

FIGS. 1-4 show a lighting module 10 of a projector-reflector type according to an embodiment of the invention. FIG. 1 shows the lighting module 10 in a low beam mode and FIGS. 2-4 show the lighting module 10 in a high beam mode. The module 10 includes a semiconductor light-emitting element 12 such as a light emitting diode (LED), for example. It is understood that additional light-emitting elements 12 can be used as desired. The light-emitting element 12 is connected to a source of electricity (not shown) and is disposed adjacent a reflector 14. In the embodiment shown, the reflector 14 is an ellipsoidal type, although other reflector types may be used as desired. An inner surface 16 of the reflector 14 has a substantially ellipsoidal shape and is adapted to reflect light in a desired direction.

A movable shield 18 is spaced from the light-emitting element 12 and the reflector 14 in the same direction as the reflected light. The shield 18 is movable in any direction as desired such as vertical as indicated by the arrow V illustrated in FIG. 2 and horizontal as indicated by the arrow H illustrated in FIG. 4. An upper surface 20 of the shield 18 is adapted to reflect light directed thereon.

A lens 22 is further spaced from the light-emitting element 12 and the reflector 14 in the direction of the reflected light. In the embodiment shown, the lens 22 is a condenser lens, although other lens types can be used as desired. A first side 24 of the lens 22 is substantially planar and a second side 26 of the lens 22 has a convex shape.

In use in a low beam mode as illustrated in FIG. 1, a first set of light rays 28 is emitted from the light-emitting element 12 of the lighting module 10. The first set of light rays 28 is reflected from the inner surface 16 of the reflector 14 towards the shield 18. The first set of light rays 28 is reflected from the upper surface 20 of the shield 18. Then, the first set of light rays 28 is directed to the first side 24 of the lens 22 and passes therethrough. Upon exiting the second side 26 of the lens 22, the first set of light rays 28 is caused to be directed in a downward direction from horizontal by the lens 22. Thus, the first set of light rays 28 forms a pattern consistent with the low beam mode.

A second set of light rays 30 is emitted from the light-emitting element 12 with the first set of light rays 28. The second set of light rays 30 is reflected from the inner surface 16 of the reflector 14 towards the shield 18. However, the second set of light rays 30 is not directed on the upper surface 20 of the shield 18. The second set of light rays 30 bypass the shield 18, enter the first side 24 of the lens 22, pass through the lens 22, and exit the second side 26 of the lens 22. Upon exiting the second side 26 of the lens 22, the second set of light rays 30 is directed in a downward direction from horizontal. The resulting pattern formed by the second set of light rays 30 is consistent with the low beam mode.

In use in a first high beam mode as illustrated in FIG. 2, the first set of light rays 28 is emitted from the light-emitting element 12 of the lighting module 10. The first set of light rays 28 is reflected from the inner surface 16 of the reflector 14 towards the shield 18. In the first high beam mode, the shield 18 has been caused to be moved downwardly from the position shown in FIG. 1. In the embodiment shown, the shield 18 has been moved downwardly by approximately one (1) millimeter, although the shield 18 can be moved other distances and other directions as desired to result in different desired patterns formed by the first set of light rays 28. The first set of light rays 28 is reflected from a different portion of the upper surface 20 of the shield 18 from that shown in FIG. 1 and at a greater distance from the light-emitting element 12 and the reflector 14. Thus, when the first set of light rays 28 is directed to the first side 24 of the lens 22, the first set of light rays 28 impinge upon a different area of the first side 24 of the lens 22 and pass therethrough. Upon exiting the second side 26 of the lens 22, the first set of light rays 28 is caused to be directed in an upward direction from horizontal by the lens 22. The first set of light rays 28 form a pattern consistent with the first high beam mode.

The second set of light rays 30 is emitted from the light-emitting element 12 with the first set of light rays 28. The path of the second set of light rays 30 is the same as described above for FIG. 1. The second set of light rays 30 is reflected from the inner surface 16 of the reflector 14 towards the shield 18. However, the second set of light rays 30 bypass the shield 18, enter the first side 24 of the lens 22, pass through the lens 22, and exit the second side 26 of the lens 22. Upon exiting the second side 26 of the lens 22, the second set of light rays 30 is directed in a downward direction from horizontal. The resulting pattern formed by the second set of light rays 30 is consistent with the low beam mode.

In use in a second high beam mode as illustrated in FIG. 3, the first set of light rays 28 is emitted from the light-emitting element 12 of the lighting module 10. The first set of light rays 28 is reflected from the inner surface 16 of the reflector 14 towards the shield 18 and the lens 22. In the second high beam mode, the shield 18 has been caused to be moved downwardly from the position shown in FIG. 1 and entirely out of the path of travel of the first set of light rays 28. The first set of light rays 28 is directed to and enters the first side 24 of the lens 22, and pass therethrough. When the first set of light rays 28 exit the second side 26 of the lens 22, the first set of light rays 28 is caused to be directed in an upward direction from horizontal by the lens 22. The first set of light rays 28 form a pattern consistent with the second high beam mode.

The second set of light rays 30 is emitted from the light-emitting element 12 with the first set of light rays 28. The path of the second set of light rays 30 is the same as described above for FIGS. 1 and 2. The second set of light rays 30 is reflected from the inner surface 16 of the reflector 14 towards the shield 18. However, the second set of light rays 30 bypass the shield 18, enter the first side 24 of the lens 22, pass through the lens 22, and exit the second side 26 of the lens 22. Upon exiting the second side 26 of the lens 22, the second set of light rays 30 is directed in a downward direction from horizontal. The resulting pattern formed by the second set of light rays 30 is consistent with the low beam mode.

A third high beam mode is illustrated in FIG. 4. The first set of light rays 28 is emitted from the light-emitting element 12 of the lighting module 10 and reflected from the inner surface 16 of the reflector 14 towards the shield 18 and the lens 22. In the third high beam mode, the shield 18 has been caused to be moved horizontally away from the light-emitting element 12 and the reflector 14 and towards the lens 22 from the position shown in FIG. 1. It is understood that the shield 18 can be moved any desired distance to result in different desired patterns formed by the first set of light rays 28. The first set of light rays 28 is reflected from the upper surface 20 of the shield 18 and is directed to the first side 24 of the lens 22 and pass therethrough. Upon exiting the second side 26 of the lens 22, the first set of light rays 28 is caused to be directed both in an upward direction and a downward direction from horizontal by the lens 22. Thus, the first set of light rays 28 forms a pattern consistent with both the low beam mode and the third high beam mode.

The second set of light rays 30 is emitted from the light-emitting element 12 with the first set of light rays 28. The second set of light rays 30 is reflected from the inner surface 16 of the reflector 14 towards the shield 18. However, the second set of light rays 30 bypass the shield 18, enter the first side 24 of the lens 22, pass through the lens 22, and exit the second side 26 of the lens 22. However, it is understood that if the reflector 14 is moved a predetermined distance, that all or a substantial portion of the light rays emitted from the light-emitting element 12 could be reflected from the surface 20 thereof. Upon exiting the second side 26 of the lens 22, the second set of light rays 30 is directed in a downward direction from horizontal. The resulting pattern formed by the second set of light rays 30 is consistent with the low beam mode.

Figure 5:
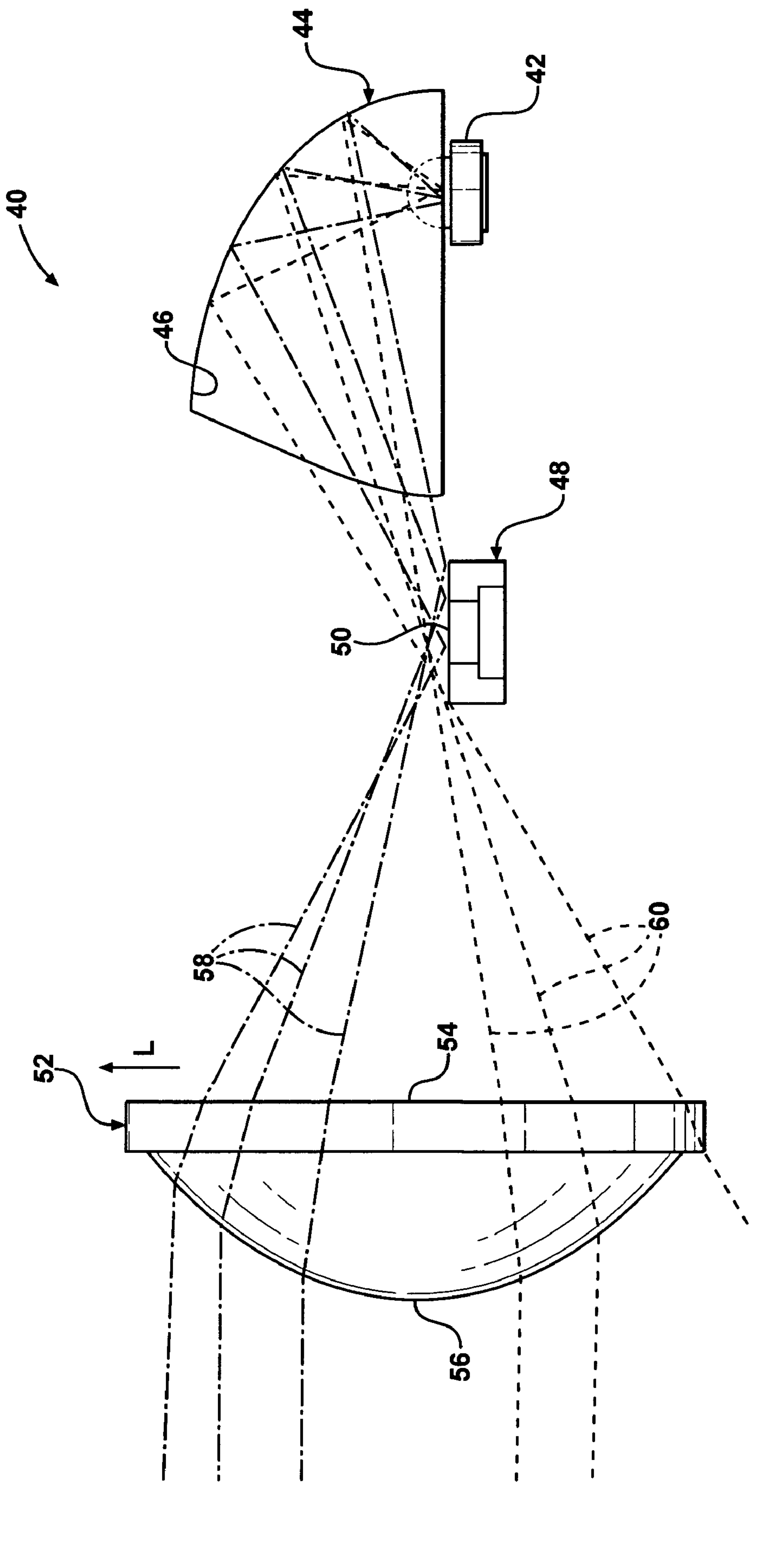
FIG. 5 is a side view of the lighting module of FIG. 1 and showing the lighting module in a fourth high beam mode.

FIG. 5 shows a lighting module 40 of a projector-reflector type according to another embodiment of the invention in a high beam mode. The module 40 has a similar structure to that illustrated in FIG. 1 including a semiconductor light-emitting element 42 such as a light emitting diode (LED), for example. It is understood that additional light-emitting elements 42 can be used as desired. The light-emitting element 42 is connected to a source of electricity (not shown) and is disposed adjacent a reflector 44. In the embodiment shown, the reflector 44 is an ellipsoidal type, although it is understood that other reflector types may be used as desired. An inner surface 46 of the reflector 44 has a substantially ellipsoidal shape and is adapted to reflect light in a desired direction.

A shield 48 is spaced from the light-emitting element 42 and the reflector 44 in the same direction as the reflected light. An upper surface 50 of the shield 48 is adapted to reflect light directed thereon.

A movable lens 52 is further spaced from the light-emitting element 42 and the reflector 44 in the direction of the reflected light. As illustrated in FIG. 5, the lens 52 is movable in the vertical direction as indicated by the arrow L. However, it is understood that the lens 52 can be moved in other directions as desired, without departing from the scope and spirit of the invention. In the embodiment shown, the lens 52 is a condenser lens, although other lens types can be used as desired. A first side 54 of the lens 52 is substantially planar, and a second side 56 of the lens 52 has a convex shape.

In use, a first set of light rays 58 is emitted from the light-emitting element 42 of the lighting module 40. The first set of light rays 58 is reflected from the inner surface 46 of the reflector 44 towards the shield 48. The first set of light rays 58 is reflected from the upper surface 50 of the shield 48 and directed to the first side 54 of the lens 52. The lens 52 illustrated in FIG. 5 has been moved upwardly from the position shown in FIG. 1 as indicated by the arrow L. The first set of light rays 58 is reflected from the reflector 44 to impinge upon a different part of the first side 54 of the lens 52 from that shown in FIG. 1. The first set of light rays 58 pass through the lens 52 and exit the second side 56 of the lens 52. Upon exiting the second side 56 of the lens 52, the first set of light rays 58 is caused to be directed in an upward direction from horizontal. Thus, the first set of light rays 58 forms a pattern consistent with the high beam mode.

A second set of light rays 60 is emitted from the light-emitting element 42 with the first set of light rays 58. The second set of light rays 60 is reflected from the inner surface 46 of the reflector 44 towards the shield 48. However, the second set of light rays 60 is not directed on the upper surface 50 of the shield 48. The second set of light rays 60 bypass the shield 48, enter the first side 54 of the lens 52, pass through the lens 52, and exit the second side 56 of the lens 52. Upon exiting the second side 56 of the lens 52, the second set of light rays 60 is directed in an upward direction from horizontal. The resulting pattern formed by the second set of light rays 60 is consistent with the high beam mode.

It is understood that the lens 52 can be moved any distance and in any direction to result in a desired pattern of the first set of light rays 58 and the second set of light rays 60. It is further understood that the movable shield 18 of FIGS. 1-4 can be combined with the movable lens 52 of FIG. 5 to provide additional fine tuning and adjustment of the first set of light rays 58 and the second set of light rays 60 to result in a desired pattern.

Figure 6:
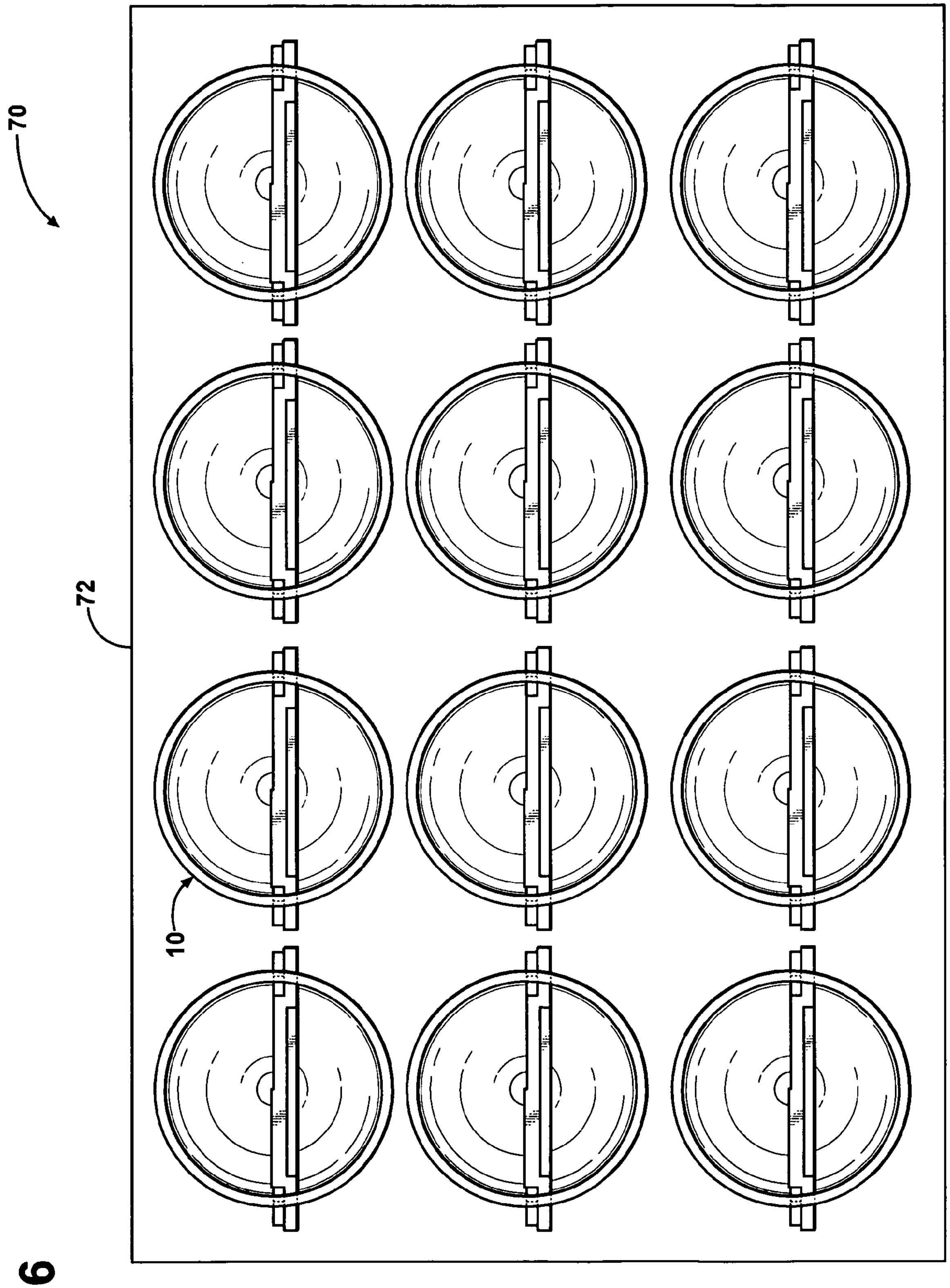
FIG. 6 is a front view showing a vehicle headlamp according to an embodiment of the invention and including a plurality of the lighting modules illustrated in FIGS. 1-5.

FIG. 6 shows a front view of a vehicle headlamp 70 according to an embodiment of the invention. The headlamp 70 includes a headlamp body 72. The body 72 houses a plurality of lighting modules 10 therein. Although shown arranged in rows, it is understood that the lighting modules 10 can be otherwise arranged as desired. Alternatively, the lighting modules 40, a combination of the lighting modules 10, 40, or the light modules 10, 40 combined with other lighting module types can be housed in the body 72 without departing from the scope and spirit of the invention.

In use, the headlamp 70 can be operated in a low beam mode or a high beam mode. In the low beam mode, the shield 18 is positioned as shown in FIG. 1. Thus, the first set of light rays 28 and the second set of light rays 30 form a pattern consistent with the low beam mode. To operate in the high beam mode, the shield 18 is caused to be moved to a position as shown in one of FIGS. 2-4. Thus, the first set of light rays 28 and the second set of light rays 30 form a pattern consistent with both the low beam mode and the high beam mode. It will be understood that each of the different positions of the shield 18 shown in FIGS. 2-4 will produce different resultant lighting patterns of the low beam mode and the high beam mode. Therefore, a desired pattern can be chosen and the shield 18 of the lighting module 10 positioned as necessary to result in the desired pattern. This permits the headlamp 70 to be adapted to a variety of driving conditions. Additional desired patterns including the low beam mode and the high beam mode can be produced by using the lighting modules 40, combinations of the lighting modules 10, 40, or the light modules 10, 40 with other lighting module types.

Figure 9:
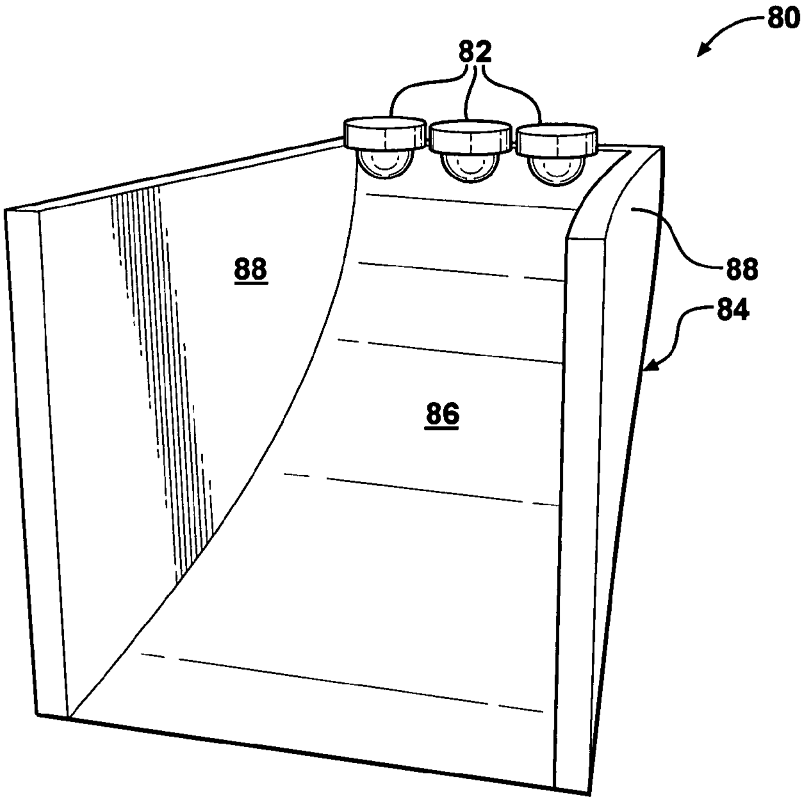
FIG. 9 is a perspective view of the lighting module of FIGS. 7 and 8.
Figure 10:
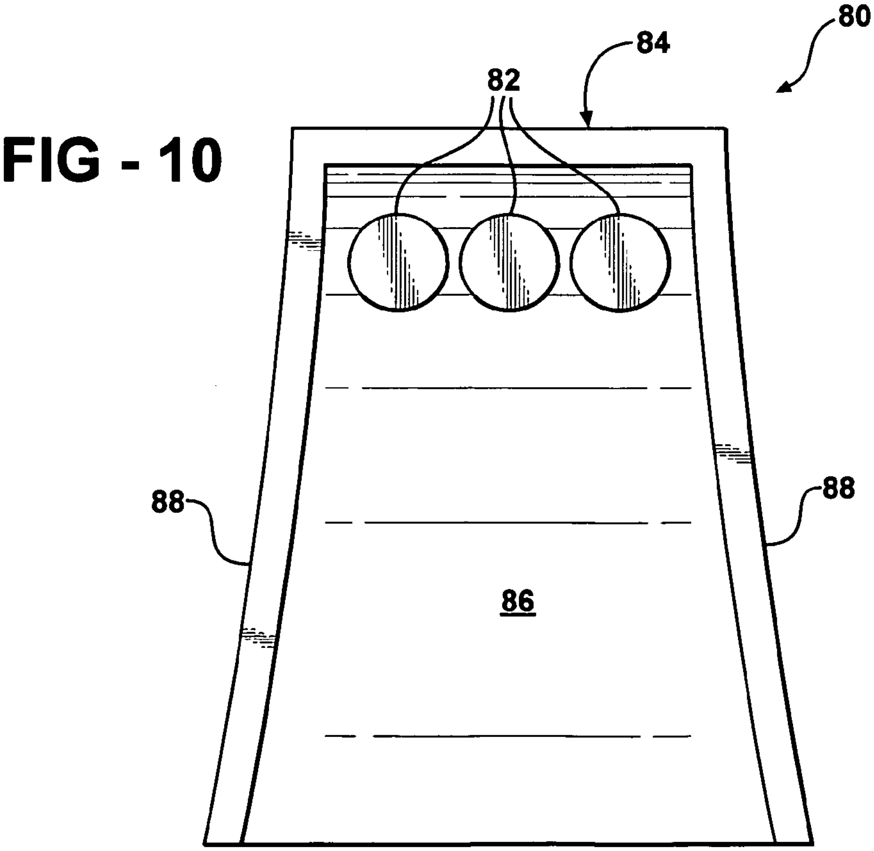
FIG. 10 is a top view of the lighting module of FIGS. 7-9.

FIGS. 7-8 show a lighting module 80 of a reflector type according to an embodiment of the invention. FIG. 7 shows the lighting module 80 in a low beam mode and FIG. 8 shows the lighting module 80 in a high beam mode. The module 80 includes a movable semiconductor light-emitting element 82 which is movable in any direction as indicated by the arrows L as desired such as horizontal as indicated by the arrow F illustrated in FIGS. 7-8. The light-emitting element 82 can be any conventional type such as a light emitting diode (LED), for example. It is understood that additional light-emitting elements 82 can be used as desired, as illustrated in FIGS. 9 and 10. The light-emitting element 82 is connected to a source of electricity (not shown).

A reflector 84 is disposed adjacent the light-emitting element 82. In the embodiment shown, the reflector 84 is a trough type, although other reflector types may be used as desired. An inner surface 86 of the reflector 84 has a substantially parabolic shape and is adapted to reflect light in a desired direction. A pair of spaced apart side walls 88 is disposed on opposing sides of the inner surface 86 of the reflector 84. As clearly shown in FIG. 10, the side walls 88 are curved outwardly away from each other. The resultant convex inner surface facilitates reflecting light in the desired direction and a smooth distribution of the light at both ends of the pattern.

In one embodiment, the lighting module 80 includes the reflector 84 having the plurality of spaced apart sidewalls 88. The reflector 84 is adapted to reflect the light rays 90 in the desired direction. The lighting module 80 further includes the at least one light-emitting element 82 adapted to be connected to the source of electricity and to emit the light rays 90. As shown in FIGS. 7-8, the light-emitting element 82 is disposed outside of a void space defined by the plurality of sidewalls 88. At least one of the light-emitting elements 82 is movable with respect to another of the light-emitting element 82 and the reflector 84, for example, as indicated by the arrows L and by the arrow F illustrated in FIGS. 7-8. The light-emitting elements 82 being movable with respect to one another enables the lighting module 80 to be changed between operation in the low-beam mode and the high-beam mode.

In use in a low beam mode as illustrated in FIG. 7, a set of light rays 90 is emitted from the light-emitting element 82 of the lighting module 80. The light rays 90 are reflected from the inner surface 86 of the reflector 84 and out of the reflector 84 in a desired direction. The light rays 90 are caused to be directed in a downward direction from horizontal by the reflector 84. Thus, the light rays 90 form a pattern consistent with a low beam mode.

In use in a high beam mode as illustrated in FIG. 8, the light-emitting element 82 has been caused to be moved horizontally forward from the position shown in FIG. 7. The light rays 90 are emitted from the light-emitting element 82 of the lighting module 80 and are reflected from the inner surface 86 of the reflector 84 in the desired direction. As a result of the new position of the light-emitting element 82, the light rays 90 are reflected from a different part of the inner surface 86 of the reflector 84 from that shown in FIG. 7. Therefore, the light rays 90 are caused to be directed in an upward direction from horizontal and form a pattern consistent with a high beam mode. It is understood that the reflector 84 could be movable instead of the light-emitting element 82. The reflector 84 can be linearly movable in any direction as desired as indicated by the arrows L illustrated in FIGS. 7-8 to function in substantially the same way as described for the movable light emitting element 82. It is understood that the reflector 84 may move in any linear direction desired, and that the linear movement is not limited to the directions of the arrows L as shown. Additionally, the reflector 84 can be rotatable about a horizontal axis substantially parallel with the light rays 90 as indicated by the arcuate arrow R illustrated in FIGS. 7-8 in order to operate in the high beam mode.

Figure 11:
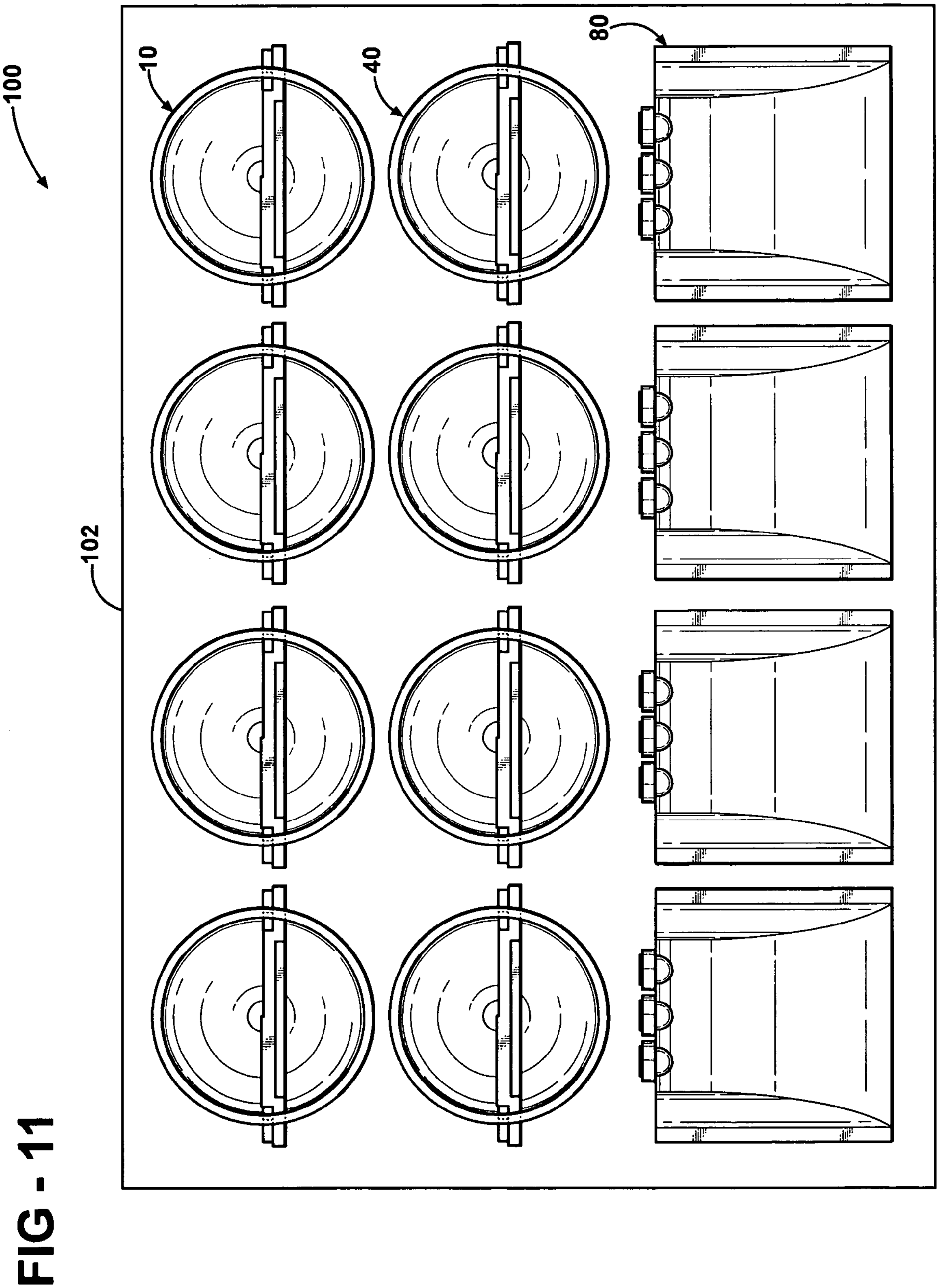
FIG. 11 is a front view showing a vehicle headlamp according to another embodiment of the invention.

FIG. 11 shows a front view of a vehicle headlamp 100 according to an embodiment of the invention. The headlamp 100 includes a headlamp body 102 which houses a plurality of lighting modules 10, 40, 80 therein. Although shown arranged in rows, it is understood that the lighting modules 10, 40, 80 can be otherwise arranged as desired. Alternatively, the lighting modules 10, 80; the lighting modules 40, 80; or the light modules 10, 40, 80 with other lighting module types can be housed in the body 72 without departing from the scope and spirit of the invention.

In use, the headlamp 100 can be operated in a low beam mode or a high beam mode. In the low beam mode, the shield 18 is positioned as shown in FIG. 1, the lens 52 is positioned as the lens 22 is positioned in FIG. 1, and the light-emitting element 82 is positioned as shown in FIG. 7. Thus, the first set of light rays 28 and the second set of light rays 30 emitted from the lighting module 10 form a pattern consistent with the low beam mode, the first set of light rays 58 and the second set of light rays 60 emitted from the lighting module 40 form a pattern consistent with the low beam mode, and the light rays 90 emitted from the lighting module 80 form a pattern consistent with the low beam mode.

To operate all of the lighting modules 10, 40, 80 in the high beam mode, the shield 18 is caused to be moved to a position as shown in one of FIGS. 2-4. Thus, the first set of light rays 28 and the second set of light rays 30 form a pattern consistent with both the low beam mode and the high beam mode. Additionally, the lens 52 is caused to move to the position shown in FIG. 5 and the first set of light rays 58 and the second set of light rays 60 are caused to form a pattern consistent with the high beam mode. Also, the light-emitting element 82 is caused to move to the position shown in FIG. 8 and the light rays 90 are caused to form a pattern consistent with the high beam mode. It will be understood that each of the different positions of the shield 18 shown in FIGS. 2-4 will produce different resultant lighting patterns of the low beam mode and the high beam mode. Therefore, a desired pattern can be chosen and the shield 18 of the lighting module 10 positioned as necessary to result in the desired pattern. This permits the headlamp 100 to be adapted to a variety of driving conditions. Additional desired patterns including the low beam mode and the high beam mode can be produced by using different combinations of the low beam mode and the high beam mode of the lighting modules 10, 40, 80, using different combinations of the lighting modules 10, 40, 80, or using the light modules 10, 40, 80 with other lighting module types.

Figure 12:
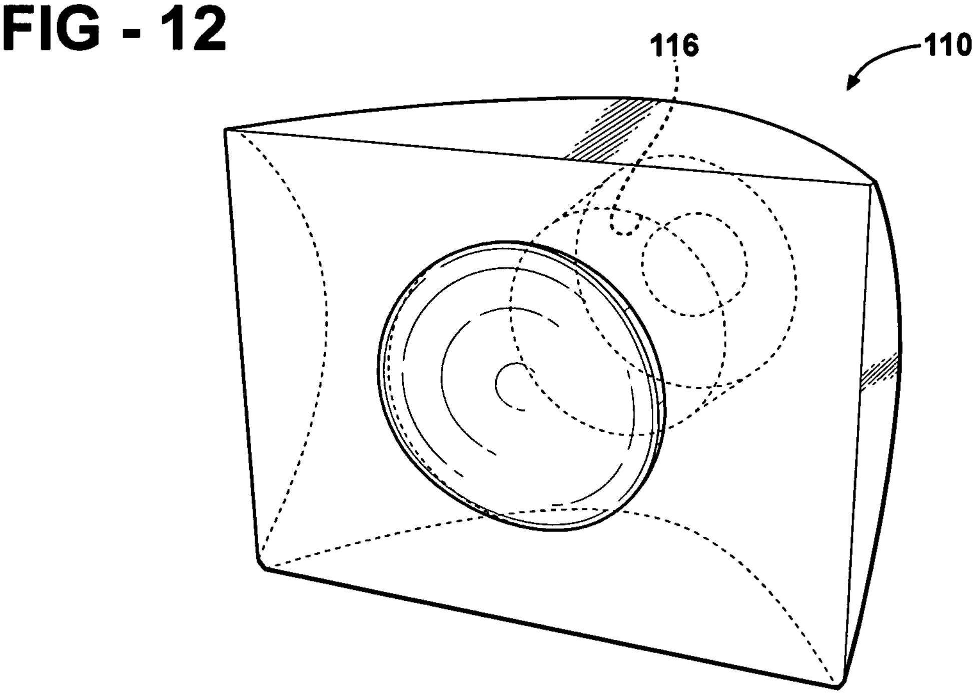
FIG. 12 is a perspective view of a lighting module for a high beam mode.
Figure 13:
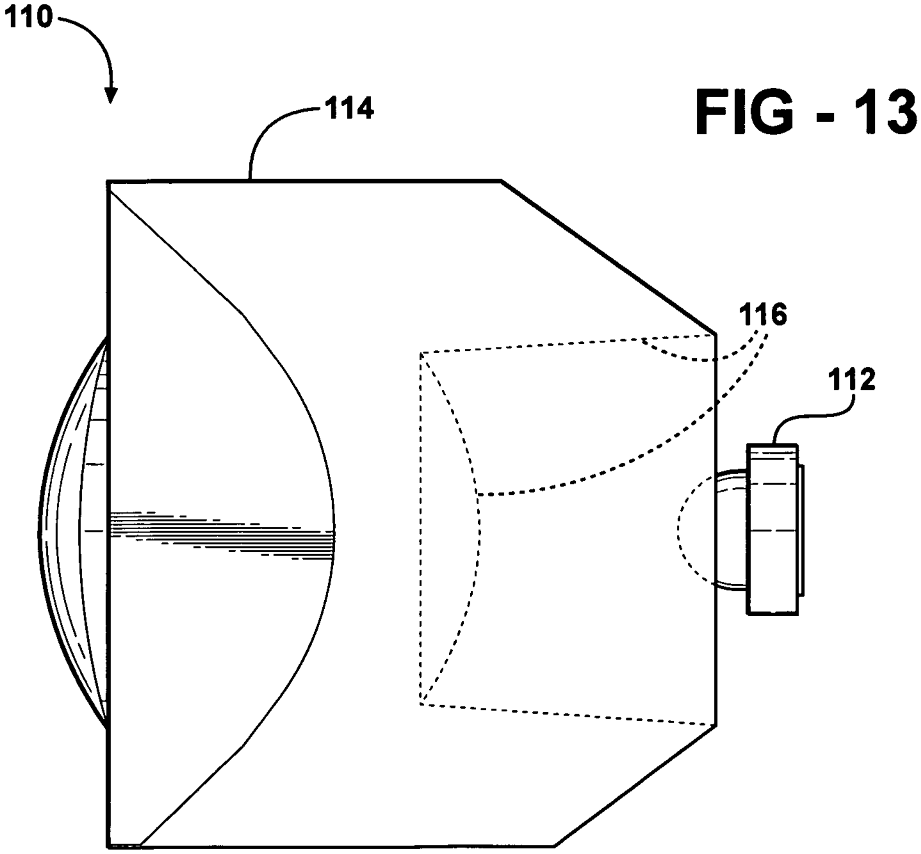
FIG. 13 is a top view of the lighting module of FIG. 12.

FIGS. 12 and 13 illustrate a lighting module 110 used to produce a pattern consistent with a high beam mode. The lighting module 110 includes a semiconductor light-emitting element 112 such as a light emitting diode (LED), for example. The light-emitting element 112 is connected to a source of electricity (not shown) and is disposed adjacent a near field lens 114 having refractive inner surfaces 116 adapted to refract light and direct the light in a desired direction.

In use, the lighting module 110 operates in a high beam mode. Light rays (not shown) are emitted from the light-emitting element 112 of the lighting module 110. The light rays are refracted by the inner surfaces 116 and are caused to exit the near field lens 114 in a pattern consistent with the high beam mode.

Figure 14:
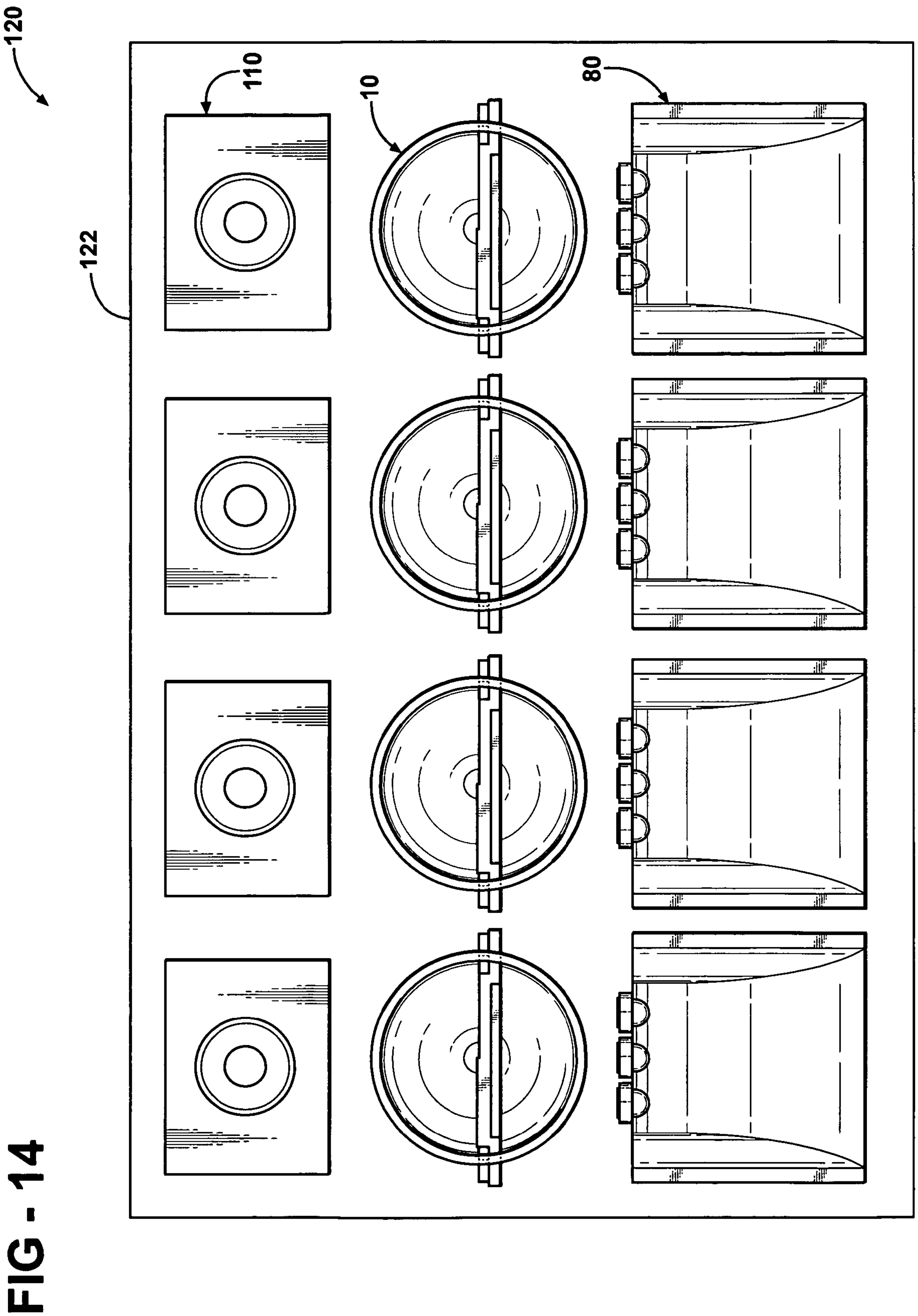

FIG. 14 shows a front view of a vehicle headlamp 120 according to an embodiment of the invention. The headlamp 120 includes a headlamp body 122 which houses a plurality of lighting modules 10, 80, 110 therein. Although shown arranged in rows, it is understood that the lighting modules 10, 80, 110 can be otherwise arranged as desired. Alternatively, the lighting modules 40, 80, 110; the lighting modules 10, 40, 110; the lighting modules 10, 40, 80, 110; or the light modules 10, 40, 80, 110 combined with other lighting module types can be housed in the body 122 without departing from the scope and spirit of the invention.

In use, the headlamp 120 can be operated in a low beam mode or a high beam mode. In the low beam mode, the shield 18 is positioned as shown in FIG. 1, the light-emitting element 82 is positioned as shown in FIG. 7, and the lighting module 110 is switched off. Thus, the first set of light rays 28 and the second set of light rays 30 emitted from the lighting module 10 form a pattern consistent with the low beam mode, and the light rays 90 emitted from the lighting module 80 form a pattern consistent with the low beam mode.

To operate the lighting modules 10, 80, 110 in the high beam mode, the shield 18 is caused to be moved to a position as shown in one of FIGS. 2-4. Thus, the first set of light rays 28 and the second set of light rays 30 form a pattern consistent with both the low beam mode and the high beam mode. Additionally, the light-emitting element 82 is caused to move to the position shown in FIG. 8 and the light rays 90 are caused to form a pattern consistent with the high beam mode. In the high beam mode for headlamp 120, the light-emitting element 112 is illuminate and the light rays emitted from the near field lens 114 to form a pattern consistent with the high beam mode.

It will be understood that each of the different positions of the shield 18 shown in FIGS. 2-4 will produce different resultant lighting patterns of the low beam mode and the high beam mode. Therefore, a desired pattern can be chosen and the shield 18 of the lighting module 10 positioned as necessary to result in the desired pattern. This permits the headlamp 120 to be adapted to a variety of driving conditions. Additional desired patterns including the low beam mode and the high beam mode can be produced by using different combinations of the low beam mode and the high beam mode of the lighting modules 10, 40, 80, along with the high beam mode of lighting module 110; using different combinations of the lighting modules 10, 40, 80, 110; or using the light modules 10, 40, 80, 110 with other lighting module types.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A headlamp for a vehicle comprising:

a headlamp body; and a plurality of lighting modules disposed in said headlamp body, wherein said modules include a first lighting module comprising a light-emitting element adapted to be connected to a source of electricity; a reflector disposed adjacent said light-emitting element; a non-pivoting shield spaced from said reflector and having a reflective upper surface; and a lens spaced from said reflector and said shield, wherein said reflector is adapted to direct light rays emitted from said light-emitting element to the reflective upper surface of said shield and said shield is adapted to reflect the light rays directed onto the reflective upper surface thereof directly to said lens, wherein one of said shield and said lens is movable in at least one of a vertical direction (V) and a horizontal direction (H) to change the lighting module between operation in a low beam mode and a high beam mode, wherein the vertical direction (V) and the horizontal direction (H) are in relation to a plane defined by a position of said light-emitting element and said lens; and a second lighting module comprising a reflector having a plurality of sidewalls and adapted to reflect light rays in a desired direction; a light-emitting element adapted to be connected to a source of electricity and to emit light rays, said light-emitting element disposed substantially outside of a void space defined by the plurality of sidewalls of said reflector, wherein at least one of said light-emitting element and said reflector is movable in a horizontal direction (F) with respect to an other of said light-emitting element and said reflector to change the lighting module between operation in a low beam mode and a high beam mode.

2. The headlamp according to claim 1, wherein the first lighting module is a projector-reflector type.

3. The headlamp according to claim 1, wherein the second lighting module is a reflector type.

4. The headlamp according to claim 1, wherein said light modules are arranged in rows.

5. The headlamp according to claim 1, further comprising at least one high beam lighting module operable only in a high beam mode.

6. The headlamp according to claim 5, wherein said high beam lighting module includes a near field lens.

7. The headlamp according to claim 6, wherein the near field lens includes a frusto-conical portion with a refractive inner surface adapted to refract light from the light-emitting element and direct the light in a desired direction for the high beam mode.

8. The headlamp according to claim 1, wherein the reflective upper surface of the shield is substantially planar.

9. A headlamp for a vehicle comprising:

a headlamp body; and a plurality of lighting modules disposed in said headlamp body, wherein said modules include at least one high beam lighting module operable only in a high beam mode;

a first lighting module comprising a stationary light-emitting element adapted to be connected to a source of electricity; a reflector disposed adjacent said light-emitting element; a non-pivoting shield spaced from said reflector and having a reflective upper surface; and a lens spaced from said reflector and said shield, wherein said reflector is adapted to direct light rays emitted from said light-emitting element to the reflective upper surface of said shield and said shield is adapted to reflect the light rays directed onto the reflective upper surface thereof directly to said lens, wherein one of said shield and said lens is movable in at least one of a vertical direction (V) and a horizontal direction (H) to change the lighting module between operation in a low beam mode and a high beam mode, wherein the vertical direction (V) and the horizontal direction (H) are in relation to a plane defined by a position of said light-emitting element and said lens; and a second lighting module comprising a reflector having a plurality of sidewalls and adapted to reflect light rays in a desired direction; a light-emitting element adapted to be connected to a source of electricity and to emit light rays, said light-emitting element disposed substantially outside of a void space defined by the plurality of sidewalls of said reflector, wherein at least one of said light-emitting element and said reflector is movable in a horizontal direction (F) with respect to an other of said light-emitting element and said reflector to change the lighting module between operation in a low beam mode and a high beam mode.

10. The headlamp according to claim 9, wherein the second lighting module is a reflector type.

11. The headlamp according to claim 9, wherein said light modules are arranged in rows.

12. The headlamp according to claim 9, wherein said high beam lighting module includes a near field lens.

13. A headlamp for a vehicle comprising a plurality of lighting modules disposed in a headlamp body, the lighting modules including:

a plurality of high beam lighting modules operable only in a high beam mode, one high beam lighting module comprising a light-emitting element adapted to be connected to a source of electricity; and a near field lens having a frusto-conical portion with a refractive inner surface, the near-field lens adapted to refract light from the light-emitting element and direct the light in a desired direction;

a plurality of projector-reflector type lighting modules, one projector-reflector type lighting module comprising a light-emitting element adapted to be connected to a source of electricity; a reflector disposed adjacent said light-emitting element; a non-pivoting shield spaced from said reflector and having a reflective upper surface; and a lens spaced from said reflector and said shield, wherein said reflector is adapted to direct light rays emitted from said light-emitting element to the reflective upper surface of said shield and said shield is adapted to reflect the light rays directed onto the reflective upper surface thereof directly to said lens, wherein one of said shield and said lens is movable in at least one of a vertical direction (V) and a horizontal direction (H) to change the lighting module between operation in a low beam mode and a high beam mode, wherein the vertical direction (V) and the horizontal direction (H) are in relation to a plane defined by a position of said light-emitting element and said lens; and a plurality of reflector type lighting modules, one reflector type lighting module comprising a reflector having a plurality of sidewalls and adapted to reflect light rays in a desired direction; a light-emitting element adapted to be connected to a source of electricity and to emit light rays, said light-emitting element disposed substantially outside of a void space defined by the plurality of sidewalls of said reflector, wherein at least one of said light-emitting element and said reflector is movable in a horizontal direction (F) with respect to an other of said light-emitting element and said reflector to change the lighting module between operation in a low beam mode and a high beam mode.

14. The headlamp according to claim 13, wherein the reflective upper surface of the shield is substantially planar.

15. The headlamp according to claim 13, wherein said light modules are arranged in rows.

16. The headlamp according to claim 13, wherein one of the plurality of projector-reflector type lighting modules only has a lens movable to change between operation in the low beam mode and the high beam mode, and an other of the plurality of projector-reflector type lighting modules only has a shield movable to change between operation in the low beam mode and the high beam mode.

* * * * *